(12) United States Patent
Chou et al.

(10) Patent No.: US 8,307,181 B2
(45) Date of Patent: Nov. 6, 2012

(54) APPARATUS AND METHOD FOR PASSWORD PROTECTION OF SECURE HIDDEN MEMORY

(75) Inventors: Chi-Yang Chou, Kao-hsiung (TW); Pei-Yen Chou, Hsin-chu (TW); Yeu-Chung Lin, Chang-hua (TW)

(73) Assignee: Condel International Technologies Inc., George Town (KY)

( * ) Notice: Subject to any disclaimer, the term of this patent is extended or adjusted under 35 U.S.C. 154(b) by 365 days.

(21) Appl. No.: 12/713,290

(22) Filed: Feb. 26, 2010

(65) Prior Publication Data

US 2011/0213941 A1 Sep. 1, 2011

(51) Int. Cl.
*G06F 12/14* (2006.01)
(52) U.S. Cl. .................................. 711/164; 711/163
(58) Field of Classification Search .................. 711/163, 711/164
See application file for complete search history.

(56) References Cited

U.S. PATENT DOCUMENTS

| | | | |
|---|---|---|---|
| 2006/0184806 A1* | 8/2006 | Luttmann et al. | 713/193 |
| 2010/0293392 A1* | 11/2010 | Miyamoto | 713/193 |

* cited by examiner

*Primary Examiner* — John Lane
(74) *Attorney, Agent, or Firm* — Thomas|Kayden

(57) ABSTRACT

Systems and methods for managing storage devices are provided. The system includes a storage device having at least one hidden area. The hidden area is created using initialization firmware, and the hidden area is allowed to be accessed by using a library. A password authentication mechanism is applied to the hidden area of the storage device. When an input password received via a specific application conforms to a predefined password of the hidden area, the hidden area is allowed to be accessed by using the library. Since the storage device may have a plurality of hidden areas, and each hidden area may have a respective password, the respective hidden areas can be independently and securely managed. Additionally, since the predefined password can be changed by a purchasing company, the manufacturer of the storage device or the microcontroller company which designed the microcontroller of the storage device is prohibited from accessing the hidden area by any means after the predefined password of the hidden area is changed by the purchasing company.

12 Claims, 2 Drawing Sheets

APPARATUS AND METHOD FOR PASSWORD PROTECTION OF SECURE HIDDEN MEMORY

BACKGROUND OF THE INVENTION

1. Field of the Invention

The disclosure relates generally to systems and methods for managing storage devices, and, more particularly to systems and methods for managing storage devices, wherein a password authentication mechanism is applied to at least one hidden area of a storage device.

2. Description of the Related Art

With electronic devices, such as computers or portable devices, being popular, digital data has become a major data recording type for the devices due to the increased convenience of digital data. Digital data is always embodied in a data carrier, such as a storage device. The data carrier may vary according to different requirements and applications.

Generally, the microcontroller of the storage device having a flash memory, such as Secure Digital (SD) cards, micro SD cards, and Universal Serial Bus (USB) disks may have a function to divide the storage area of the storage device. For example, the storage area of a micro SD/SD card may be divided into a public area and a hidden area. In addition to the public area and the hidden area, the USB disk may be further divided into a DVD-ROM area and a secure area. The public area is accessible for general consumers. General consumers can read/write data in the public area at will. The hidden area cannot be accessed by general consumers, and the data stored in the hidden area cannot be read and displayed via a card reader. Generally, the hidden area can store secret/secure data, such as unique identification (UID) of the card, keys for encryption/decryption algorithms, rights object of digital right management (DRM), and others, which is not expected to be known by consumers. The DVD-ROM area is read only and designed for computer applications, wherein an auto-run program or content can be stored in the DVD-ROM area, such that the program or content can be automatically executed or played back when the USB disk is coupled to a computer. The secure area can store personal data of consumers, wherein consumers need an account and/or password in order to enter the area.

The division of storage area is performed using initialization firmware provided by a microcontroller company during the initialization procedure for cards, such that a card manufacturer can create and read/write hidden areas. When the card manufacturer wants to grant access right of the hidden area to a purchasing company, such as a digital content company or a mobile payment company, library/machine codes compiled under a specific operating system must be provided to the purchasing company.

Generally, since consumers cannot read the data in the hidden area without the library, the data in the hidden area is secure. However, a microcontroller company may provide microcontrollers to several card manufacturers, and a card manufacturer may provide cards to several purchasing companies. Since the library for accessing the hidden area is generated from the same initialization firmware, proprietary data stored in the hidden area for a purchasing company, such as a specific digital content company, may be known by another company, thereby placing business and technical security measures of the specific digital content company at risk. Such risks are compounded for the specific digital content company as the card manufacturer also has the library for accessing the hidden area.

BRIEF SUMMARY OF THE INVENTION

Systems and methods for managing storage devices are provided.

An embodiment of a system for managing storage devices includes a storage device having at least one hidden area. The hidden area is created using initialization firmware, and the hidden area is allowed to be accessed by using a library. A password authentication mechanism is applied to the hidden area of the storage device, and the hidden area is allowed to be accessed by using the library when an input password received via a specific application conforms to a predefined password of the hidden area.

In an embodiment of a method for managing storage devices, a storage device having at least one hidden area is provided. The hidden area is created using initialization firmware, and the hidden area is allowed to be accessed by using a library. A password authentication mechanism is applied to the hidden area of the storage device. When an input password received via a specific application conforms to a predefined password of the hidden area, the hidden area is allowed to be accessed by using the library.

In some embodiments, the storage device is initialized using the initialization firmware to create the hidden area of the storage device, and the hidden area is accessed by using the library, such that the predefined password is written to the storage device via the specific application by a manufacturer of the storage device.

In some embodiments, the predefined password of the hidden area is further changed into a new password via the specific application, and security data is stored to the hidden area by using the library by a purchasing company. After the purchasing company changes the password of a hidden area, there is no backdoor for the hidden area; that is, after the predefined password of the hidden area is changed by the purchasing company, the manufacturer of the storage device or the microcontroller company which designed the microcontroller of the storage device is prohibited from accessing the hidden area by any means. In some embodiments, the specific application and the library are further embedded into at least one access application by the purchasing company, such that the access application accesses the hidden area of the storage device based on the specific application and the library.

In some embodiments, the hidden area can be further segmented into at least one sector/zone, and each sector/zone can have its own password. In these embodiments, each sector/zone can correspond to a company/organization, such that a card with such segmentation can be jointly used by multiple companies/organizations, and each company/organization can have their own control of security.

Methods for managing storage devices may take the form of a program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

Systems and methods for managing storage devices are provided.

Figure 1:
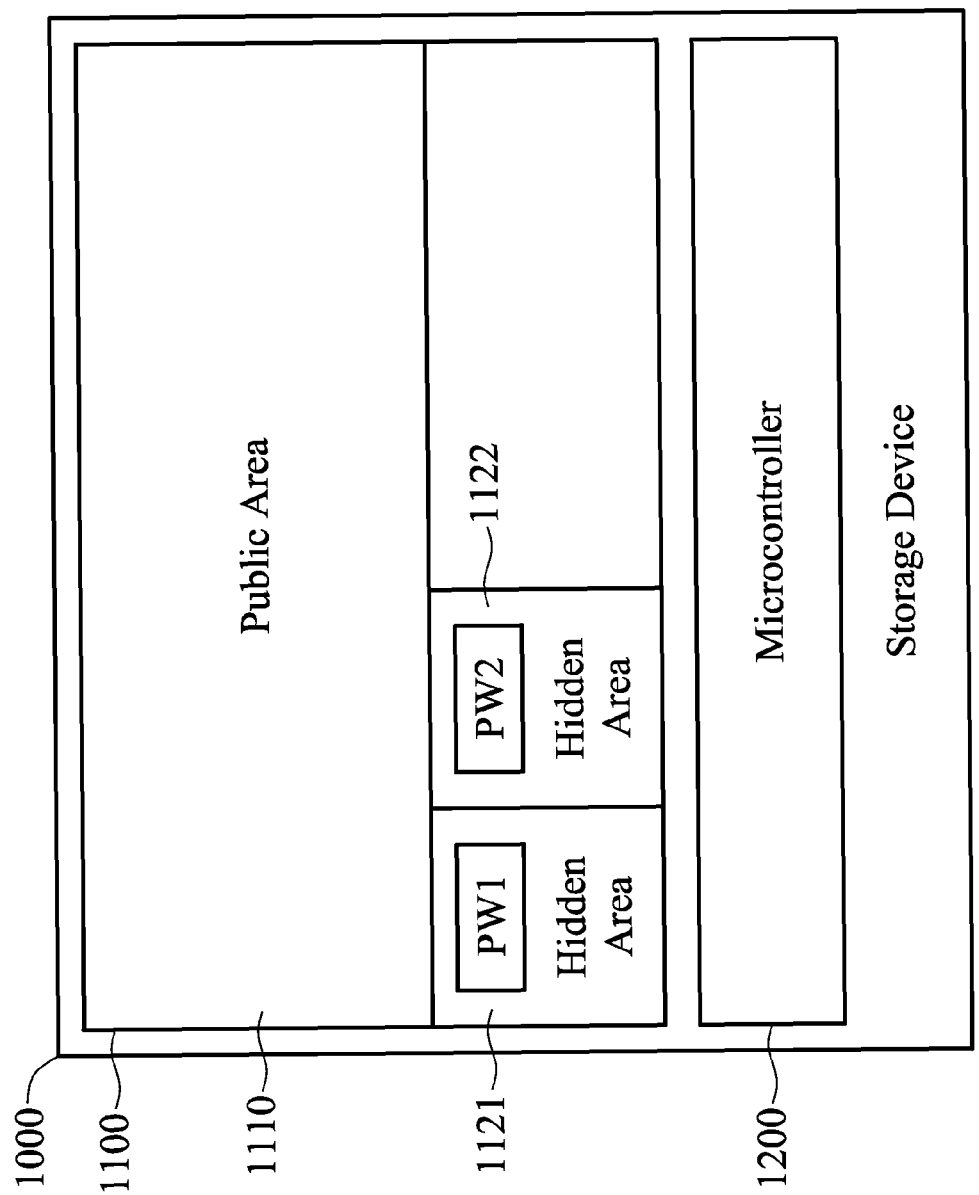
FIG. 1 is a schematic diagram illustrating an embodiment of a system for managing storage devices according to the invention.

FIG. 1 is a schematic diagram illustrating an embodiment of a system for managing storage devices according to the invention.

The system for managing storage devices comprises a storage device 1000. The storage device 1000 may be a memory device, such as an SD/micro SD card, and/or USB disk. The storage device 1000 comprises a microcontroller 1200 and a storage area 1100. The microcontroller 1200 can control the operations of hardware, firmware, and/or software on the storage device 1000. In some embodiments, the storage device 1000 may connect to an electronic device via an interface, such as an SD/micro SD interface or a USB interface (not shown), and receive access requests from the electronic device. The storage area 1100 comprises a public area 1110 and at least one hidden area (1121 and 1122). The public area 1110 is accessible to general consumers. General consumers can read/write data at will in the public area 1110. The hidden area of the storage device 1000 can be applied with a password authentication mechanism. Each hidden area may have an individual password. For example, the hidden area 1121 has a password PW1, and the hidden area 1122 has a password PW2. It is understood that, in some embodiments, the password can be recorded at a specific logical address of the respective hidden area. The respective hidden area can be accessed when a corresponding password authentication is passed. For example, when an input password received via a specific application conforms to the password PW1 of the hidden area 1121, the hidden area 1121 is allowed to be accessed by using a library. It is noted that, the library and the specific application can be provided by the microcontroller company, wherein the library can be used for accessing the hidden area of the storage device 1000, and the specific application can be used for inputting/updating the password of the respective hidden area. It is noted that, two hidden areas are disclosed in the embodiment of FIG. 1. However, the number of hidden areas is not limited thereto. The number of hidden areas can be one, two or more. For example, in some embodiments, only one hidden area may be in the storage area 1100, and one password can be used to control access of the hidden area of the storage area 1100.

Figure 2:
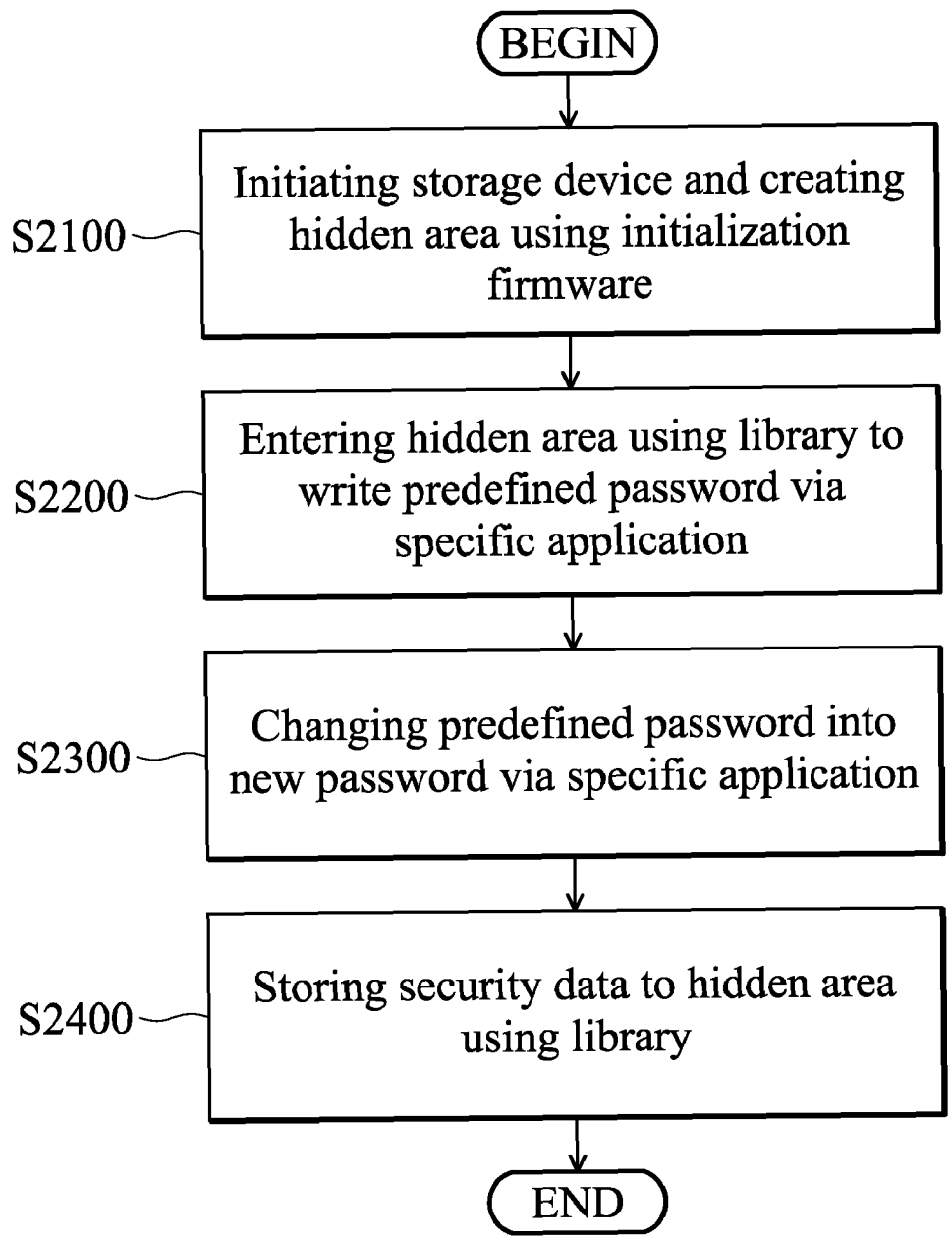
FIG. 2 is a flowchart of an embodiment of a method for managing storage devices according to the invention.

FIG. 2 is a flowchart of an embodiment of a method for managing storage devices according to the invention. In this embodiment, a password authentication mechanism can be applied to at least one hidden area of a storage device.

In step S2100, the storage device is initiated using initialization firmware to create at least one hidden area of the storage device. It is understood that, in some embodiments, the initialization firmware can be provided by the microcontroller company which designed the microcontroller of the storage device, wherein the initialization firmware can be used for creating one or several hidden areas for a storage device. In step S2200, the hidden area is accessed by using a library such that a predefined password via a specific application may be written thereto. It is understood that, in some embodiments, the predefined password can be recorded at a specific logical address of the hidden area. It is understood that, in some embodiments, the library and the specific application can be also provided by the microcontroller company, wherein the library can be used for accessing the hidden area of the storage device, and the specific application can be used for inputting/updating the password. It is noted that, in some embodiments, steps S2100 and S2200 can be performed by a manufacturer of the storage device. In step S2300, the predefined password of the hidden area is changed into a new password via the specific application, and in step S2400, security data, such as unique identification (UID) of the card, keys for an encryption/decryption algorithm, rights object of digital right management (DRM), and others is stored to the hidden area by using the library. It is understood that, in some embodiments, after the hidden area is created and the predefined password is written to the hidden area, the manufacturer of the storage device can deliver the initiated storage device with the hidden area and the predefined password recorded therein, the library, and the specific application to a purchasing company, such as a digital content company or a mobile payment company. Further, the manufacturer of the storage device can also tell the predefined password to the purchasing company. It is noted that, in some embodiments, steps S2300 and S2400 can be performed by the purchasing company. The purchasing company can first perform a validation procedure using the predefined password, and change the predefined password via the specific application. It is noted that, after the purchasing company changes the password of the hidden area, there is no backdoor for the hidden area; that is, after the predefined password of the hidden area is changed by the purchasing company, there is no way for the manufacturer of the storage device or the microcontroller company which designed the microcontroller of the storage device to access the hidden area by any means.

In some embodiments, the purchasing company can further embed the specific application and the library into at least one access application, such as a card validation program, an encryption/decryption program, or a DRM program, such that the access application can directly access the hidden area of the storage device based on the specific application and the library. In some embodiments, the access applications can be stored to the public area of the storage device.

It is understood that, in some embodiments, the respective hidden areas of the storage device may correspond to different card organizations/applications. Since the storage device is shared by several card organizations/applications, related costs can be shared thereamong. Additionally, since respective hidden areas may have a respective password, and can be accordingly managed, proprietary data stored in the respective hidden areas for a specific digital content company may not be known by other companies using the same storage device; thus ensuring security of the respective hidden area. Further, although the microcontroller company and the manufacture of the storage device may have the library and the initialization firmware, the data in the hidden area is still secure since the purchasing company can change the predefined password into a new password, which would be known only by the purchasing company.

Methods for managing storage devices, or certain aspects or portions thereof, may take the form of a program code (i.e., executable instructions) embodied in tangible media, such as flash card or USB disk, wherein, when the program code is loaded into and executed by a machine, such as a computer, the machine thereby becomes an apparatus for practicing the methods.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A method for managing storage devices, comprising:
    providing a storage device comprising at least one hidden area, wherein the hidden area is created using initialization firmware, and the hidden area is allowed to be accessed by using a library; and
    applying a password authentication mechanism to the hidden area of the storage device, wherein the hidden area is allowed to be accessed by using the library when an input password received via a specific application conforms to a predefined password of the hidden area,
    wherein the storage device comprises a micro SD (Secure Digital)/SD card or a USB (Universal Serial Bus) disk.

2. The method of claim 1, further comprising changing the predefined password of the hidden area into a new password via the specific application, and storing security data to the hidden area by using the library by a purchasing company.

3. The method of claim 2, further comprising prohibiting the manufacturer of the storage device or the microcontroller company which designed the microcontroller of the storage device from accessing the hidden area by any means after the predefined password of the hidden area is changed by the purchasing company.

4. The method of claim 2, further comprising initiating the storage device using the initialization firmware to create the hidden area of the storage device, and accessing the hidden area by using the library, such that the predefined password is written to the storage device via the specific application by a manufacturer of the storage device.

5. The method of claim 4, wherein the predefined password is written to a specific logical address of the hidden area.

6. The method of claim 2, further comprising embedding the specific application and the library into at least one access application by the purchasing company, such that the access application accesses the hidden area of the storage device based on the specific application and the library.

7. A system for managing storage devices, comprising:
    a storage device, comprising at least one hidden area, wherein the hidden area is created using initialization firmware, the hidden area is allowed to be accessed by using a library, and a password authentication mechanism is applied to the hidden area of the storage device,
    wherein the hidden area is allowed to be accessed by using the library when an input password received via a specific application conforms to a predefined password of the hidden area; and
    wherein the storage device comprises a micro SD (Secure Digital)/SD card or a USB (Universal Serial Bus) disk.

8. The system of claim 7, wherein the predefined password of the hidden area is further changed into a new password via the specific application, and security data is stored to the hidden area by using the library by a purchasing company.

9. The system of claim 8, wherein the manufacturer of the storage device or the microcontroller company which designed the microcontroller of the storage device is prohibited from accessing the hidden area by any means after the predefined password of the hidden area is changed by the purchasing company.

10. The system of claim 8, wherein the storage device is initiated using the initialization firmware to create the hidden area of the storage device, and the hidden area is accessed by using the library, such that the predefined password is written to the storage device via the specific application by a manufacturer of the storage device.

11. The system of claim 10, wherein the predefined password is written to a specific logical address of the hidden area.

12. The system of claim 8, wherein the specific application and the library are further embedded into at least one access application by the purchasing company, such that the access application accesses the hidden area of the storage device based on the specific application and the library.

* * * * *